United States Patent
Fagrenius et al.

(10) Patent No.: US 8,061,609 B2
(45) Date of Patent: Nov. 22, 2011

(54) SPACE EFFICIENT CARD READERS AND ELECTRONIC DEVICES INCORPORATING SAME

(75) Inventors: Gustav Fagrenius, Dalby (SE); Henrik Fristedt, Karlshamn (SE); Göran Schack, Åhus (SE)

(73) Assignee: Sony Ericsson Mobile Communications AB (SE)

( * ) Notice: Subject to any disclaimer, the term of this patent is extended or adjusted under 35 U.S.C. 154(b) by 1056 days.

(21) Appl. No.: 11/803,292

(22) Filed: May 14, 2007

(65) Prior Publication Data

US 2008/0283602 A1 Nov. 20, 2008

(51) Int. Cl.
*G06K 7/06* (2006.01)

(52) U.S. Cl. ........................................ 235/441

(58) Field of Classification Search .................. 235/441; 324/761, 455; 439/700, 326, 630
See application file for complete search history.

(56) References Cited

U.S. PATENT DOCUMENTS

| | | | |
|---|---|---|---|
| 6,971,918 B1 | 12/2005 | Su et al. | |
| 6,974,343 B2 * | 12/2005 | Zheng et al. | 439/326 |
| 7,052,290 B1 | 5/2006 | Thornton | |
| 2005/0070171 A1 | 3/2005 | Zheng et al. | |
| 2007/0152689 A1 * | 7/2007 | Lee et al. | 324/761 |

FOREIGN PATENT DOCUMENTS

| | | |
|---|---|---|
| EP | 0738983 A | 10/1996 |
| EP | 0905827 A2 | 3/1999 |
| FR | 2870427 A | 11/2005 |
| WO | WO 98/34218 | 8/1998 |
| WO | WO 2004/068391 A1 | 8/2004 |
| WO | WO 2007/025758 A1 | 3/2007 |

OTHER PUBLICATIONS

International Search Report and Written Opinion of the International Searching Authority, corresponding to PCT/EP2007/062144, mailed Jan. 31, 2008.

* cited by examiner

*Primary Examiner* — Thien M. Le
*Assistant Examiner* — Sonji Johnson
(74) *Attorney, Agent, or Firm* — Myers Bigel Sibley & Sajovec, P.A.

(57) ABSTRACT

A space-efficient card reader for various electronic devices includes a plurality of adjacent, spaced-apart electrical connector pins extending outwardly from a portion of a printed circuit board (PCB) in an electronic device. A cover is configured to overlie the PCB portion, and includes a plurality of adjacent, spaced-apart apertures formed therein. Each aperture is configured to receive a respective one of the connector pins therethrough when the cover is in a secured position overlying the PCB portion. A receptacle is secured to an outer surface of the cover, and is configured to removably receive a card therein such that electrical contacts on the card make contact with the connector pins extending through the apertures in the cover.

21 Claims, 3 Drawing Sheets

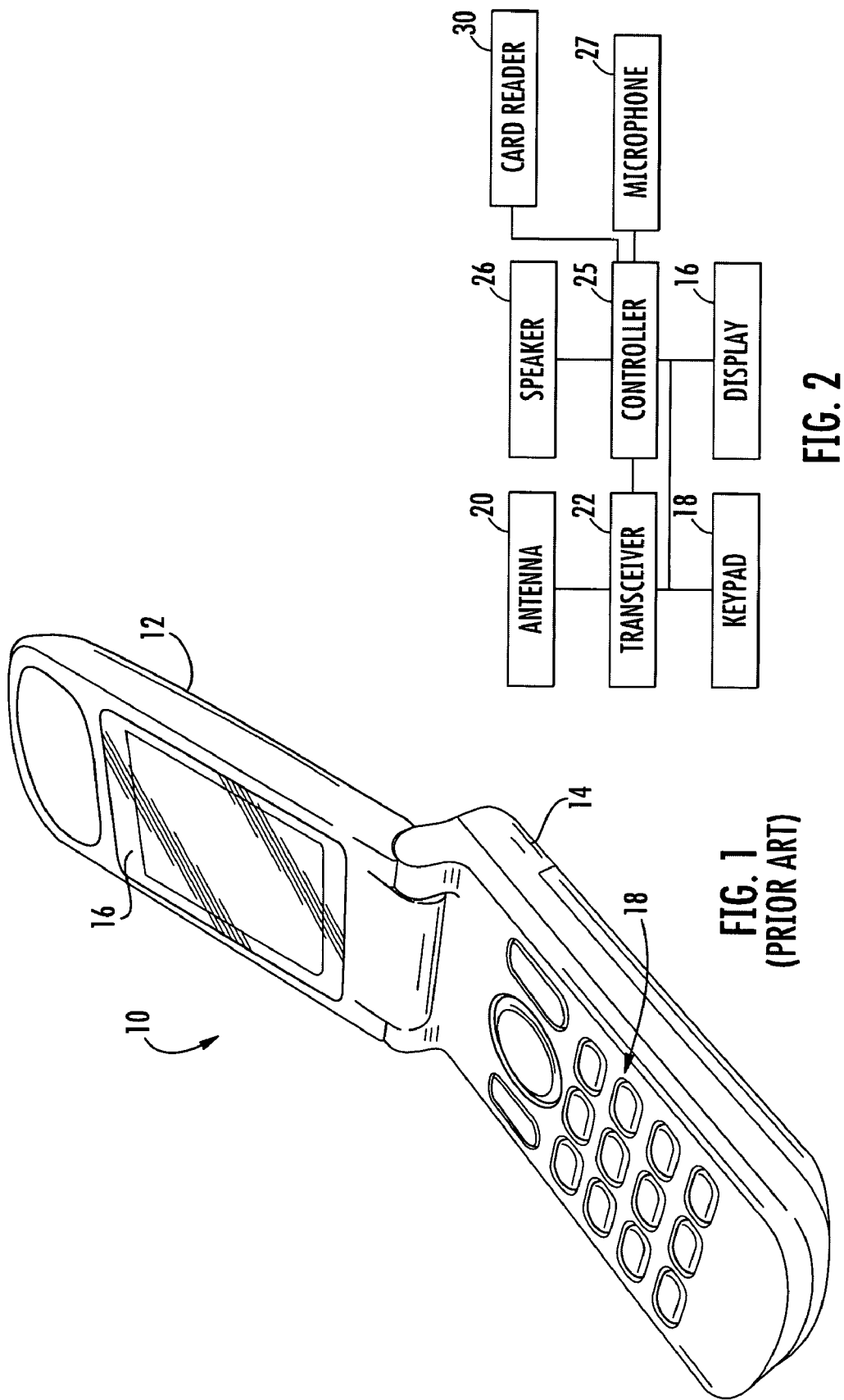

SPACE EFFICIENT CARD READERS AND ELECTRONIC DEVICES INCORPORATING SAME

FIELD OF THE INVENTION

The present invention relates generally to electronic devices and, more particularly, to card readers within electronic devices.

BACKGROUND OF THE INVENTION

Radiotelephones generally refer to communications terminals which provide a wireless communications link to one or more other communications terminals. Radiotelephones may be used in a variety of different applications, including cellular telephone, land-mobile (e.g., police and fire departments), and satellite communications systems. Radiotelephones may utilize SIM (subscriber identity module) cards, also referred to as "smart" cards, that store data for cellular telephone subscribers. Such data may include user identity, location and phone number, network authorization data, personal security keys, contact lists, stored text messages, etc. SIM cards may also provide various authentication and encryption features to protect data and prevent eavesdropping.

SIM cards are configured to be installed and removed from radiotelephones. A SIM card reader is typically incorporated into a radiotelephone and facilitates installation and removal of a SIM card. As such, SIM cards are portable and can be switched from one radiotelephone to another. The portability of data offers a number of benefits. For example, a user that buys a new radiotelephone can install the current SIM card to associate the new radiotelephone with the same number and user preferences as the old one, etc.

Electronic devices, such as radiotelephones, are undergoing miniaturization. Indeed, many contemporary radiotelephones are less than 11 centimeters in length. As a result, there is increasing interest in conserving valuable space in the ever decreasing size of radiotelephones and other electronic devices. Conventional SIM card readers, as well as other types of card readers, utilize valuable space within electronic devices, such as radiotelephones, that could be used for other components. Therefore, a need exists for card readers that utilize less space than conventional card readers.

SUMMARY OF THE INVENTION

In view of the above discussion, space-efficient card readers for electronic devices are provided. According to some embodiments of the present invention, a card reader for an electronic device includes a plurality of adjacent, spaced-apart electrical connector pins extending outwardly from a portion of a printed circuit board (PCB) in the electronic device. A cover is configured to overlie the PCB portion, and includes a plurality of adjacent, spaced-apart apertures formed therein. Each aperture is configured to receive a respective one of the connector pins therethrough when the cover is in a secured position overlying the PCB portion. A receptacle is secured to an outer surface of the cover, and is configured to slidably and removably receive a card (e.g., a SIM card, memory card, etc.) therein such that electrical contacts on the card make contact with the connector pins extending through the apertures in the cover.

According to some embodiments of the present invention, a guide sleeve is disposed within each of the cover apertures. Each guide sleeve is configured to facilitate insertion of a connector pin through a respective aperture. For example, a guide sleeve may have a shape or configuration that is configured to direct a connector pin through a respective aperture. According to some embodiments of the present invention, a connector pin has a convex conical shape and a corresponding guide sleeve has a concave conical shape that is configured to receive the connector pin therein.

According to some embodiments of the present invention, the cover is a shield can lid that comprises, for example, electrically conductive material, such as copper, copper alloy, aluminum, aluminum alloy, gold, gold alloy, silver, silver alloy, solder coated copper, nickel plated steel, metalized polymeric material, etc. The guide sleeves comprise electrically insulative material, such as polymeric material. In addition to facilitating alignment between the connector pins and cover apertures, the electrically insulative guide sleeves prevent contact between the connector pins and the cover.

According to some embodiments of the present invention, each connector pin is associated with a biasing member, such as a spring, that is configured to urge the connector pin away from the PCB. Exemplary springs are coil springs; however, other types of springs may be utilized.

According to some embodiments of the present invention, a card reader for an electronic device, such as a radiotelephone, includes a plurality of adjacent, spaced-apart electrical connector pins extending outwardly from a portion of a PCB. Each connector pin includes a biasing member, such as a coil or other type of spring, that is configured to urge the connector pin away from the PCB. A cover is configured to overlie the PCB portion and has a plurality of adjacent, spaced-apart apertures formed therein. Each aperture is configured to receive a respective one of the connector pins therethrough when the cover is in a secured position overlying the PCB portion. A guide sleeve is disposed within each of the apertures. Each guide sleeve is configured to facilitate insertion of a connector pin through a respective aperture. A card receptacle is secured to an outer surface of the cover and is configured to slidably and removably receive a card (e.g., a SIM card, memory card, etc.) therein such that electrical contacts on the card make contact with the connector pins.

According to some embodiments of the present invention, each connector pin has a convex conical shape and each corresponding guide sleeve has a concave conical shape that is configured to receive the connector pin therein.

According to some embodiments of the present invention, the cover is a shield can lid that comprises electrically conductive material, and the guide sleeves comprise electrically insulative material. In addition to facilitating alignment between the connector pins and cover apertures, the electrically insulative guide sleeves prevent contact between the connector pins and the cover.

According to some embodiments of the present invention, an electronic device, such as a radiotelephone, includes a housing; a printed circuit board (PCB) disposed within the housing; a plurality of adjacent, spaced-apart electrical connector pins extending outwardly from a portion of the PCB; a cover configured to overlie the PCB portion, wherein the cover has a plurality of adjacent, spaced-apart apertures formed therein, each aperture configured to receive a respective one of the connector pins therethrough when the lid is in a secured position overlying the PCB portion; and a receptacle secured to an outer surface of the cover, wherein the receptacle is configured to removably receive a card therein such that electrical contacts on the card make contact with the connector pins. A card, such as a SIM card, memory card, etc. is removably disposed within the receptacle.

According to some embodiments of the present invention, the electronic device includes guide sleeves disposed within each of the cover apertures. Each guide sleeve is configured to facilitate insertion of a connector pin through a respective aperture. For example, a guide sleeve may have a shape or configuration that is configured to easily receive a connector pin therein and direct the connector pin through a respective aperture. According to some embodiments of the present invention, a connector pin has a convex conical shape and a corresponding guide sleeve has a concave conical shape that is configured to receive the connector pin therein.

According to some embodiments of the present invention, the cover serves as a shield can lid within the electronic device and comprises electrically conductive material. The guide sleeves comprise electrically insulative material, such as polymeric material, and prevent contact between the connector pins and the cover.

According to some embodiments of the present invention, the electronic device includes biasing members, such as springs, associated with each connector pin. Each biasing member is configured to urge a connector pin away from the PCB. Exemplary springs are coil springs; however, other types of springs may be utilized.

According to some embodiments of the present invention, each connector pin within the electronic device has a convex conical shape and each corresponding guide sleeve has a concave conical shape that is configured to receive the connector pin therein.

BRIEF DESCRIPTION OF THE DRAWINGS

FIG. 1 is a perspective view of a radiotelephone within which card readers according to embodiments of the present invention can be utilized.

FIG. 2 is a schematic block diagram of a conventional arrangement of electronic components within the radiotelephone of FIG. 1.

DETAILED DESCRIPTION OF THE INVENTION

Figure 3:
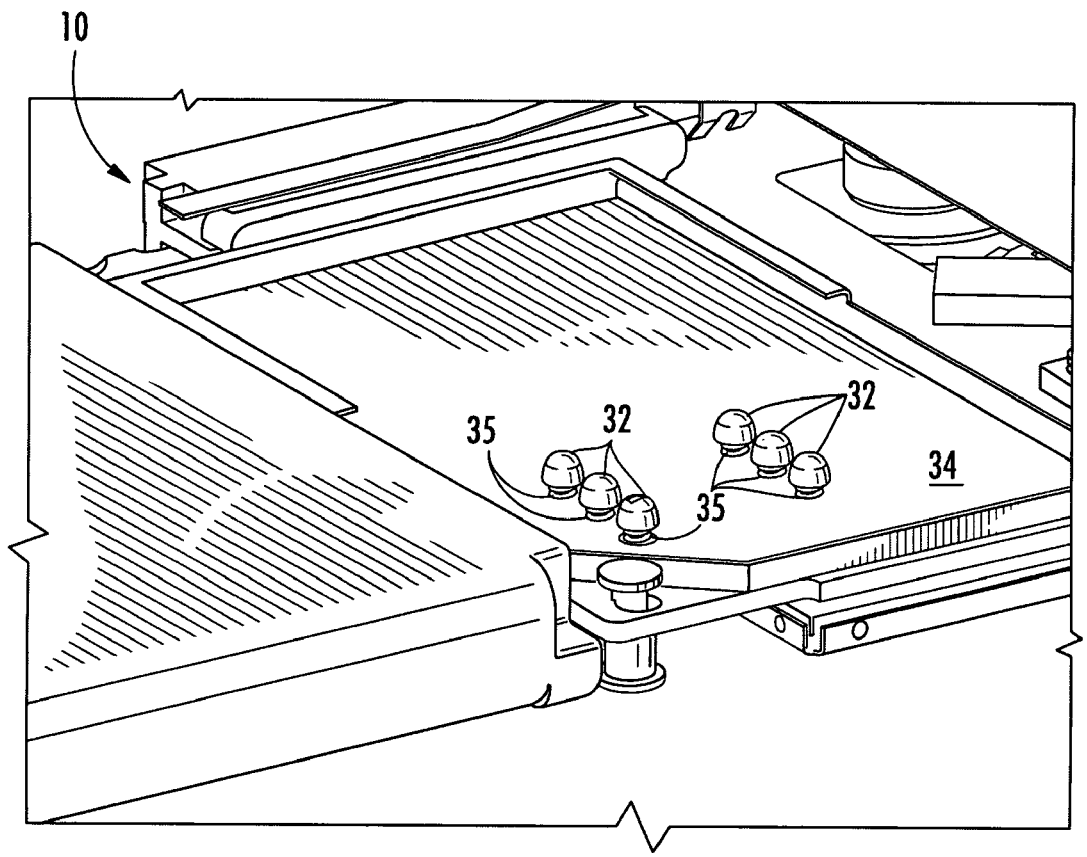
FIG. 3 is a perspective view of a PCB within an electronic device that forms a portion of a card reader according to embodiments of the present invention and that includes a plurality of adjacent, spaced-apart electrical connector pins extending outwardly therefrom.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise, defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

The term "electronic device" includes any type of device that may include a card reader according to embodiments of the present invention. Exemplary electronic devices that may include card readers according to embodiments of the present invention include, but are not limited to, cellular wireless terminals (e.g., radiotelephones); Personal Communications System (PCS) terminals; personal digital assistants (PDAs); laptop and/or palmtop devices; other mobile/wireless devices; desktop computing devices, etc.

Referring to FIG. 1, a conventional radiotelephone device that may include a card reader according to embodiments of the present invention is illustrated. However, card readers, according to embodiments of the present invention, can be incorporated into any type of radiotelephone device as well as other electronic device. The illustrated radiotelephone 10 includes a first housing portion 12 and a second housing portion 14 hingedly connected together. The first housing portion 12 includes a display screen 16 and the second housing portion 14 includes a keypad 18. Housed within one or both of the first and second housings 12, 14 are electronic components (not shown) that enable the radiotelephone 10 to transmit and receive radiotelephone communications signals. Card readers, according to embodiments of the present invention, may be located within either of the two housing portions 12, 14.

Referring now to FIG. 2, a conventional arrangement of electronic components that enable a radiotelephone, such as illustrated in FIG. 1, to transmit and/or receive wireless terminal communication signals is illustrated. As illustrated, an antenna 20 for receiving and/or transmitting wireless communication signals is electrically connected to a radio-frequency (RF) transceiver 22 that is further electrically connected to a controller 25, such as a microprocessor. The controller 25 is electrically connected to a speaker 26 that is configured to transmit a signal from the controller 25 to a user of a radiotelephone. The controller 25 is also electrically connected to a microphone 27 that receives a voice signal from a user and transmits the voice signal through the controller 25 and transceiver 22 to a remote device. The controller 25 is electrically connected to the keypad 18 and the display 16. The controller 25 is electrically connected to a card reader 30, such as, for example, a SIM card reader, memory card reader, etc.

Referring now to FIGS. 3-6, a card reader 30 for use within an electronic device 10, such as, for example, the radiotelephone of FIG. 1, according to embodiments of the present invention, is illustrated. Card readers, according to embodiments of the present invention, may be used for any type of card that is configured to be installed within and/or removed from an electronic device. Exemplary card readers include, but are not limited to SIM card readers, memory card readers, etc. Although the illustrated electronic device 10 is a radiotelephone, card reader 30 is not limited to use within radiotelephones.

In the illustrated embodiment, a plurality of adjacent, spaced-apart electrical connector pins 32 extend outwardly from a portion of a printed circuit board (PCB) 34 within the electronic device 10. The connector pins 32 are conductive elements configured to engage the electrical contacts of a card (e.g., SIM card, memory card, etc.) and electrically interconnect electronic components in the card with, for example, the controller 25. The illustrated connector pins 32 each have a convex conical configuration to facilitate engagement with apertures in a cover, as described below. However, embodiments of the present invention are not limited to connector pins with a conical shape. Various other shapes and configurations may be utilized.

According to embodiments of the present invention, each connector pin 32 is urged away from the PCB 34 by a biasing member, such as a spring. In the illustrated embodiment, a coil spring 35 is utilized to urge each connector pin 32 away from the PCB 34. The coil spring 35 for each connector pin 32 also helps facilitate engagement with a respective aperture in a cover, as described below. One or more of the connector pins 32 may include an aperture formed therein to provide multiple connecting points and/or to provide a more secure connection, as would be understood by those skilled in the art.

Figure 4:
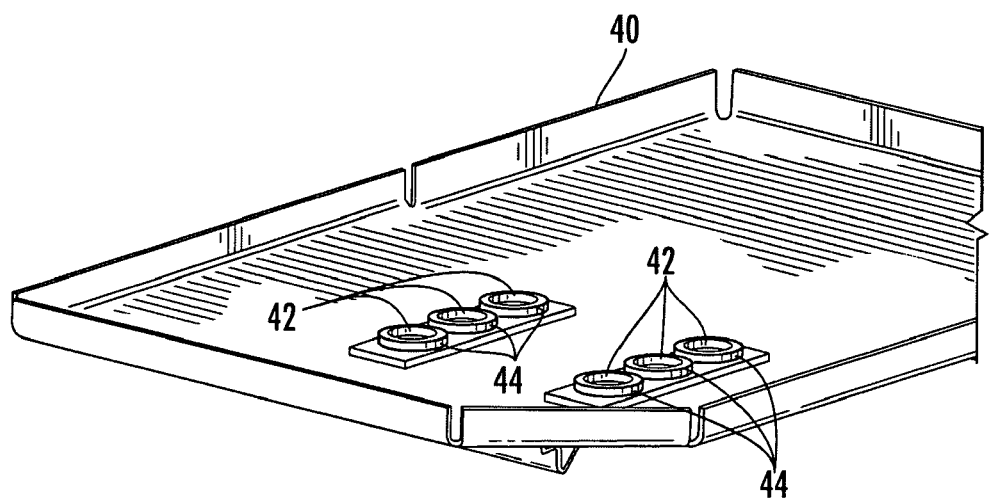
FIG. 4 is a perspective view of a cover that is a portion of a card reader according to embodiments of the present invention and that is configured to overlie the PCB illustrated in FIG. 3.
Figure 5:
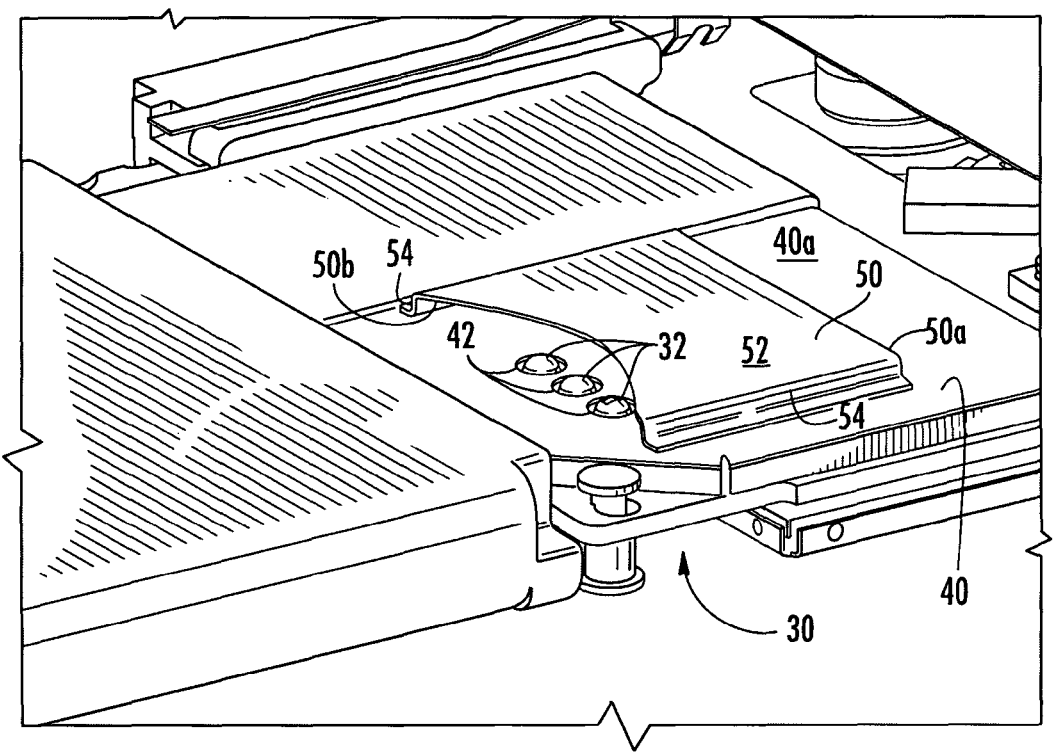
FIG. 5 is a perspective view of the cover of FIG. 4 secured to the PCB of FIG. 3 and illustrate a receptacle on the cover that is configured to slidably and removably receive a card therein, according to some embodiments of the present invention.

A cover 40 is configured to overlie at least a portion of the PCB 34 having the connector pins 32 extending therefrom. The cover 40 includes a plurality of adjacent, spaced-apart apertures 42 formed therein (FIG. 4). Each aperture 42 is configured to receive a respective one of the connector pins 32 therethrough when the cover 40 is in a secured position overlying the PCB 34 (FIG. 5).

In the illustrated embodiment, a guide sleeve 44 is disposed within each of the cover apertures 42. Each guide sleeve 44 is configured to facilitate insertion of a connector pin 32 through a respective aperture 42. For example, the connector pins 32 may have a convex conical configuration and each respective guide sleeve 44 may have a corresponding concave conical configuration that facilitates alignment of the connector pins 32 within the respective apertures 42 when the cover 40 is placed on top of the PCB 34. Moreover, the configuration of the guide sleeves 44 can prevent the various connector pins 32 from becoming stuck within the apertures 42. When the cover 40 is placed on top of the PCB 34, the connector pins 32 penetrate the respective apertures 42 and protrude through the cover 40, as illustrated in FIG. 5. The conical shape of the pins 32 and guide sleeves 44, along with the biasing force of the springs 35, allow for some mismatch in the placement of the cover 40 relative to the connector pins 32.

The shapes of the guide sleeves 44 and connector pins 32 are not limited to conical shapes. Various shapes may be utilized that facilitate alignment of the connector pins 32 with the apertures 42 when the cover 40 is secured to the PCB 34.

In addition, the guide sleeves 44 can be utilized to define the height of the connector pins 32 extending through the cover 40. As such, the connector pins 32 can be sufficiently preloaded by the biasing force of the springs 35 such that a card can be easily inserted and removed from the card reader 10 while insuring good electrical contact therewith.

In the illustrated embodiment, the guide sleeves 44 for each row of connector pins 32 are connected. This may be done for ease of manufacturing and/or assembly and is not required. The guide sleeves 44 may be joined together in various shapes and configurations. Moreover, one or more guide sleeves 44 may be a discrete part and need not be connected to other guide sleeves 44.

As known to those of skill in the art, PCBs generally include one or more layers of an insulating substrate (e.g., plastic) on which an electrical circuit is formed by depositing a predetermined pattern of a conducting metal (e.g., copper) for connecting various electronic components (e.g., semiconductors) which are mounted on or embedded in the PCB layers. Many of these electrical circuits include components which can operate at a high radio frequency (RF). The RF emissions from these components can interfere with the proper operation of other components or circuits in the vicinity of the PCB. As such, conductive housings, referred to as "shield cans" are configured to surround various portions of PCBs.

Accordingly, in some embodiments of the present invention, the card reader 30 may be part of a shield can. For example, the PCB 34 may serve as a ground plane portion of a shielding system and the cover 40 may be formed from conductive material and may serve as a lid of a shield can. The cover 40 may be formed from various conductive materials when used as a shield can lid. Exemplary conductive materials include, but are not limited to, copper, copper alloy, aluminum, aluminum alloy, gold, gold alloy, silver, silver alloy, solder coated copper, nickel plated steel, and metalized polymeric material. In embodiments where the cover 40 serves as a shield can lid, the guide sleeves 44 are formed from electrically insulative material such as, for example, polymeric material, in order to prevent the electrical connector pins 32 from contacting the cover 40 when extending through the respective cover apertures 42.

Shield cans can have somewhat complex shapes and configurations because of PCB space constraints, particularly within small electronic devices such as radiotelephones. Accordingly, cover 40 can have virtually any shape and configuration and is not limited to the illustrated configuration in the figures.

Figure 6:
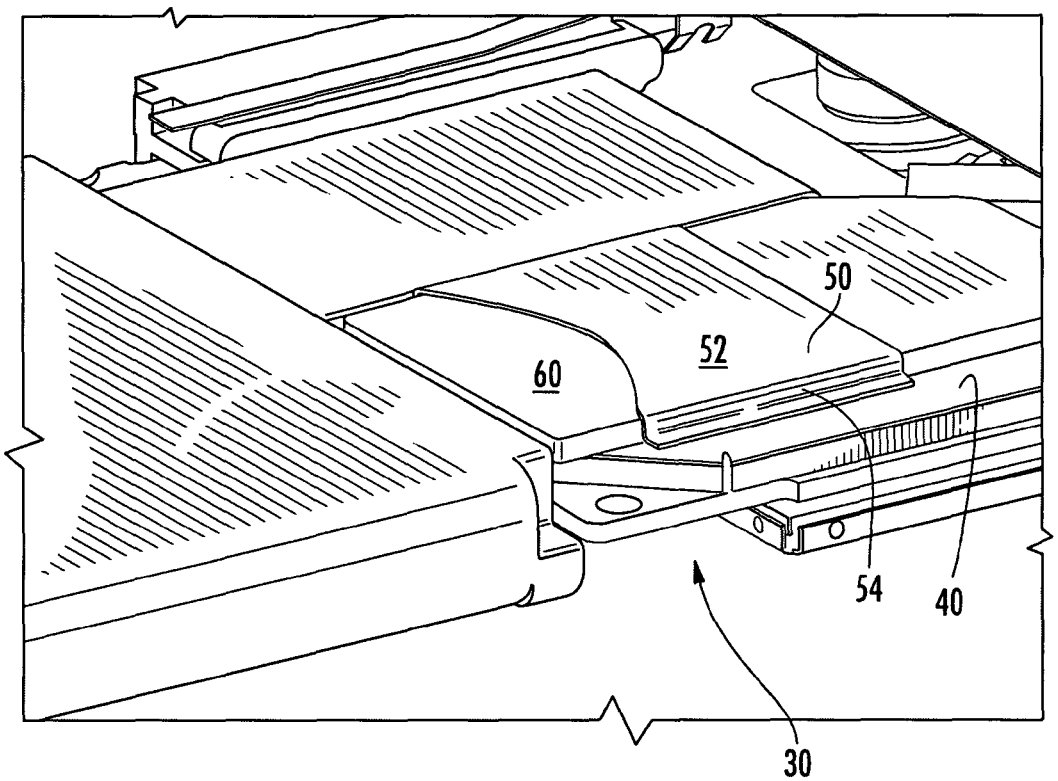
FIG. 6 illustrates a card removably disposed within the receptacle illustrated in FIG. 5.

The illustrated cover 40 also includes a receptacle 50 that is secured to an outer surface 40*a* of the cover 40. The receptacle 50 is open at both ends 50*a*, 50*b*, as illustrated, and is configured to slidably and removably receive a card 60 therein such that electrical contacts on the card 60 make contact with the connector pins 32 (FIG. 6). The illustrated receptacle 50 includes a wall 52 with side portions 54 depending downwardly therefrom. As such, the wall 52 is maintained in spaced-apart relationship with the cover 40. A card 60 is slidably inserted between wall 52 and cover 40 as illustrated in FIG. 6. The distance between the wall 52 and cover 40 is selected to allow the card 60 to be inserted and removed, yet maintain electrical contact between contacts (not shown) on the card 60 and the electrical connector pins 32.

By surface mounting the connector pins 32 on the PCB 34, the surrounding area of the PCB 34 can be used for other components. As such, valuable space, particularly within small electronic devices such as radiotelephones, can be saved. For example, conventional SIM card readers utilize approximately 150 mm$^2$ of PCB space. A card reader 30, according to embodiments of the present invention, utilizes only approximately 25 mm$^2$ of PCB space.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A card reader for an electronic device, wherein the electronic device includes a printed circuit board (PCB), the card reader comprising:
    a plurality of adjacent, spaced-apart electrical connector pins extending outwardly from a portion of the PCB;
    a shield can lid configured to overlie the PCB portion, wherein the shield can lid has a plurality of adjacent, spaced-apart apertures formed therein, each aperture configured to receive a respective one of the connector pins therethrough when the shield can lid is in a secured position overlying the PCB portion, and wherein the shield can lid comprises electrically conductive material outside of the apertures;
    a guide sleeve disposed within each of the apertures, wherein each guide sleeve is configured to facilitate insertion of a connector pin through a respective aperture, and wherein the guide sleeves comprise electrically insulative material within the apertures of the shield can lid; and
    a receptacle secured to an outer surface of the shield can lid, wherein the receptacle is configured to removably receive a card therein such that electrical contacts on the card make contact with the connector pins.

2. The card reader of claim 1, wherein each guide sleeve has a conical configuration.

3. The card receptacle assembly of claim 2, wherein each guide sleeve comprises polymeric material.

4. The card reader of claim 1, wherein the shield can lid comprises material selected from the group consisting of copper, copper alloy, aluminum, aluminum alloy, gold, gold alloy, silver, silver alloy, solder coated copper, nickel plated steel, and metalized polymeric material.

5. The card reader of claim 1, wherein each connector pin has a conical configuration.

6. The card reader of claim 1, wherein each connector pin is directly attached to a surface of the PCB and comprises a biasing member configured to urge the connector pin away from the PCB.

7. The card reader of claim 6, wherein the biasing member comprises a coil spring.

8. A card reader for an electronic device, wherein the electronic device includes a printed circuit board (PCB), the card reader comprising:
    a plurality of adjacent, spaced-apart electrical connector pins extending outwardly from a portion of the PCB, wherein each connector pin comprises a biasing member configured to urge the connector pin away from the PCB;
    a shield can lid configured to overlie the PCB portion, wherein the shield can lid has a plurality of adjacent, spaced-apart apertures formed therein, each aperture configured to receive a respective one of the connector pins therethrough when the shield can lid is in a secured position overlying the PCB portion, and wherein the shield can lid comprises electrically conductive material outside of the apertures;
    a guide sleeve disposed within each of the apertures, wherein each guide sleeve is configured to facilitate insertion of a connector pin through a respective aperture, and wherein the guide sleeves comprise electrically insulative material within the apertures of the shield can lid; and
    a receptacle secured to an outer surface of the shield can lid, wherein the receptacle is configured to removably receive a card therein such that electrical contacts on the card make contact with the connector pins.

9. The card reader of claim 8, wherein each guide sleeve has a conical configuration.

10. The card reader of claim 8, wherein each connector pin has a conical configuration.

11. The card reader of claim 8, wherein the biasing member comprises a coil spring.

12. An electronic device, comprising:
    a housing;
    a printed circuit board (PCB) disposed within the housing;
    a plurality of adjacent, spaced-apart electrical connector pins extending outwardly from a portion of the PCB;
    a shield can lid configured to overlie the PCB portion, wherein the shield can lid has a plurality of adjacent, spaced-apart apertures formed therein, each aperture configured to receive a respective one of the connector pins therethrough when the shield can lid is in a secured position overlying the PCB portion, and wherein the shield can lid comprises electrically conductive material outside of the apertures;
    a guide sleeve disposed within each of the apertures, wherein each guide sleeve is configured to facilitate insertion of a connector pin through a respective aperture, and wherein the guide sleeves comprise electrically insulative material within the apertures of the shield can lid; and a receptacle secured to an outer surface of the shield can lid, wherein the receptacle is configured to removably receive a card therein such that electrical contacts on the card make contact with the connector pins.

13. The electronic device of claim 12, further comprising a card disposed within the receptacle.

14. The electronic device of claim 13, wherein the card is a subscriber identity module (SIM) card.

15. The electronic device of claim 13, wherein the card is a memory card.

16. The electronic device of claim 12, wherein each guide sleeve has a conical configuration.

17. The electronic device of claim 12, wherein each connector pin has a conical configuration.

18. The electronic device of claim 12, wherein each connector pin is directly attached to a surface of the PCB and comprises a biasing member configured to urge the connector pin away from the PCB.

19. The electronic device of claim 18, wherein the biasing member comprises a spring.

20. The electronic device of claim 12, wherein the electronic device is a radiotelephone.

21. The electronic device of claim 12, wherein the shield can lid is hollow outside of portions including the apertures.

* * * * *